US008117267B2

(12) United States Patent
Gardner et al.

(10) Patent No.: US 8,117,267 B2
(45) Date of Patent: *Feb. 14, 2012

(54) SYSTEM AND METHOD FOR PROVISIONING AN EMAIL ACCOUNT USING MAIL EXCHANGE AND ADDRESS RECORDS

(75) Inventors: Darren L. Gardner, Issaquah, WA (US); Suryanarayana Murthy Gorty, Redmond, WA (US); Steven J. McCarthy, Bellevue, WA (US)

(73) Assignee: Teamon Systems, Inc., Wilmington, DE (US)

( * ) Notice: Subject to any disclaimer, the term of this patent is extended or adjusted under 35 U.S.C. 154(b) by 809 days.

This patent is subject to a terminal disclaimer.

(21) Appl. No.: 11/238,754

(22) Filed: Sep. 29, 2005

(65) Prior Publication Data

US 2007/0073819 A1    Mar. 29, 2007

(51) Int. Cl.
*G06F 15/16* (2006.01)
*G06F 15/177* (2006.01)

(52) U.S. Cl. ........ 709/206; 709/217; 709/222; 709/227; 709/228

(58) Field of Classification Search .......... 709/204–206, 709/217–219, 220–222, 227–228
See application file for complete search history.

(56) References Cited

U.S. PATENT DOCUMENTS

| | | | |
|---|---|---|---|
| 5,968,117 A | 10/1999 | Schuetze | 709/206 |
| 6,249,807 B1 | 6/2001 | Shaw et al. | 709/206 |
| 6,272,532 B1 | 8/2001 | Feinleib | 709/206 |
| 6,282,565 B1 | 8/2001 | Shaw et al. | 709/206 |
| 6,393,464 B1 | 5/2002 | Dieterman | 709/206 |
| 6,434,600 B2 | 8/2002 | Waite et al. | 709/206 |
| 6,446,114 B1 | 9/2002 | Bulfer et al. | 709/206 |
| 6,549,937 B1 | 4/2003 | Auerbach et al. | 709/206 |
| 6,594,706 B1 | 7/2003 | DeCoursey et al. | 709/238 |
| 6,654,787 B1 | 11/2003 | Aronson et al. | 709/206 |
| 6,728,759 B1 | 4/2004 | Na | 709/206 |
| 6,779,019 B1 | 8/2004 | Mousseau et al. | 709/206 |
| 6,832,244 B1 | 12/2004 | Raghunandan | 709/206 |
| 6,865,594 B1 | 3/2005 | Belissent et al. | 709/206 |

(Continued)

FOREIGN PATENT DOCUMENTS

GB    2 382 164 A    5/2003

(Continued)

OTHER PUBLICATIONS

J. Klensin, Simple Mail Transfer Protocol, Apr. 2001 (retrieved from http://tools.ietf.org/html/rfc2821 on Aug. 19, 2008).*

(Continued)

*Primary Examiner* — Joon H Hwang
*Assistant Examiner* — Thomas Lee, IV
(74) *Attorney, Agent, or Firm* — Allen, Dyer, Doppelt, Milbrath & Gilchrist, P.A.

(57) ABSTRACT

A system for provisioning an electronic mail (email) account of a user for allowing access to an electronic mailbox from a remote device to retrieve email includes a communications module that receives email address parameters entered by the user and transmits a domain name system (DNS) query to the Internet for returning mail exchange (MX) and address (A) records corresponding to the entered email address parameters of the user. A configuration module processes any returned MX and A records to determine whether the email address parameters entered by the user are valid before attempting to provision the email account of the user.

11 Claims, 12 Drawing Sheets

U.S. PATENT DOCUMENTS

| | | | |
|---|---|---|---|
| 2001/0032245 A1 | 10/2001 | Fodor | 709/206 |
| 2002/0004826 A1 | 1/2002 | Waite et al. | 709/223 |
| 2002/0078158 A1 | 6/2002 | Brown et al. | 709/206 |
| 2002/0112007 A1 | 8/2002 | Wood et al. | 709/206 |
| 2002/0174194 A1 | 11/2002 | Mooney et al. | 709/219 |
| 2003/0084107 A1 | 5/2003 | Covey | 709/206 |
| 2003/0115270 A1 | 6/2003 | Funk et al. | 709/206 |
| 2003/0200267 A1 | 10/2003 | Garrigues | 709/206 |
| 2004/0054719 A1 | 3/2004 | Daigle et al. | 709/203 |
| 2004/0260922 A1 | 12/2004 | Goodman et al. | 713/154 |
| 2004/0267907 A1 | 12/2004 | Gustafsson | 709/219 |
| 2005/0038857 A1* | 2/2005 | Gardner et al. | 709/206 |
| 2005/0038859 A1 | 2/2005 | Gardner et al. | 709/206 |
| 2006/0212522 A1* | 9/2006 | Walter et al. | 709/206 |

FOREIGN PATENT DOCUMENTS

| | | | |
|---|---|---|---|
| WO | 98/32273 | | 7/1998 |
| WO | 00/22543 | | 4/2000 |
| WO | WO 00/22543 | * | 4/2000 |

OTHER PUBLICATIONS

Partridge, Craig, *"Mail Routing and the Domain System,"* CSNET CIC BBN Laboratories, Inc., Jan. 1986, pp. 1-7.

* cited by examiner

SYSTEM AND METHOD FOR PROVISIONING AN EMAIL ACCOUNT USING MAIL EXCHANGE AND ADDRESS RECORDS

FIELD OF THE INVENTION

The present invention relates to the field of communications systems, and, more particularly, to electronic mail (email) communications systems and related methods.

BACKGROUND OF THE INVENTION

Electronic mail (email) has become an integral part of business and personal communications. As such, many users have multiple email accounts for work and home use. Moreover, with the increased availability of mobile cellular and wireless local area network (LAN) devices that can send and receive emails, many users wirelessly access emails from mailboxes stored on different email storage servers (e.g., corporate email storage server, Yahoo, Hotmail, AOL, etc.).

Yet, email distribution and synchronization across multiple mailboxes and over wireless networks can be quite challenging, particularly when this is done on a large scale for numerous users. For example, different email accounts may be configured differently and with non-uniform access criteria. Moreover, as emails are received at the wireless communications device, copies of the emails may still be present in the original mailboxes, which can make it difficult for users to keep their email organized.

One particularly advantageous "push" type email distribution and synchronization system is disclosed in U.S. Pat. No. 6,779,019 to Mousseau et al., which is assigned to the present Assignee and is hereby incorporated herein by reference. This system pushes user-selected data items from a host system to a user's mobile wireless communications device upon detecting the occurrence of one or more user-defined event triggers. The user may then move (or file) the data items to a particular folder within a folder hierarchy stored in the mobile wireless communications device, or may execute some other system operation on a data item. Software operating at the device and the host system then synchronizes the folder hierarchy of the device with a folder hierarchy of the host system, and any actions executed on the data items at the device are then automatically replicated on the same data items stored at the host system, thus eliminating the need for the user to manually replicate actions at the host system that have been executed at the mobile wireless communications device.

The foregoing system advantageously provides great convenience to users of wireless email communication devices for organizing and managing their email messages. Yet, further convenience and efficiency features may be desired in email distribution and synchronization systems as email usage continues to grow in popularity. For example, in new user accounts, an email provisioning and authentication system can run through a series of possible email server configurations to determine how to access an electronic mailbox for a user email account. The user can supply email address parameters such as an email address and password, but often becomes frustrated if the wrong email address parameter is typed. The user typically must wait a relatively long time to determine if something is wrong, or worse, the user may be given an advanced configuration screen and asked to provide difficult to know IP address numbers, ports and other entries because of the mistake. Some prior art systems have parsed emails and tried to provision, and as a subsequent step after failure, used MX records to aid in the process for accessing email. But those systems have not been used for provisioning in a more direct manner.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
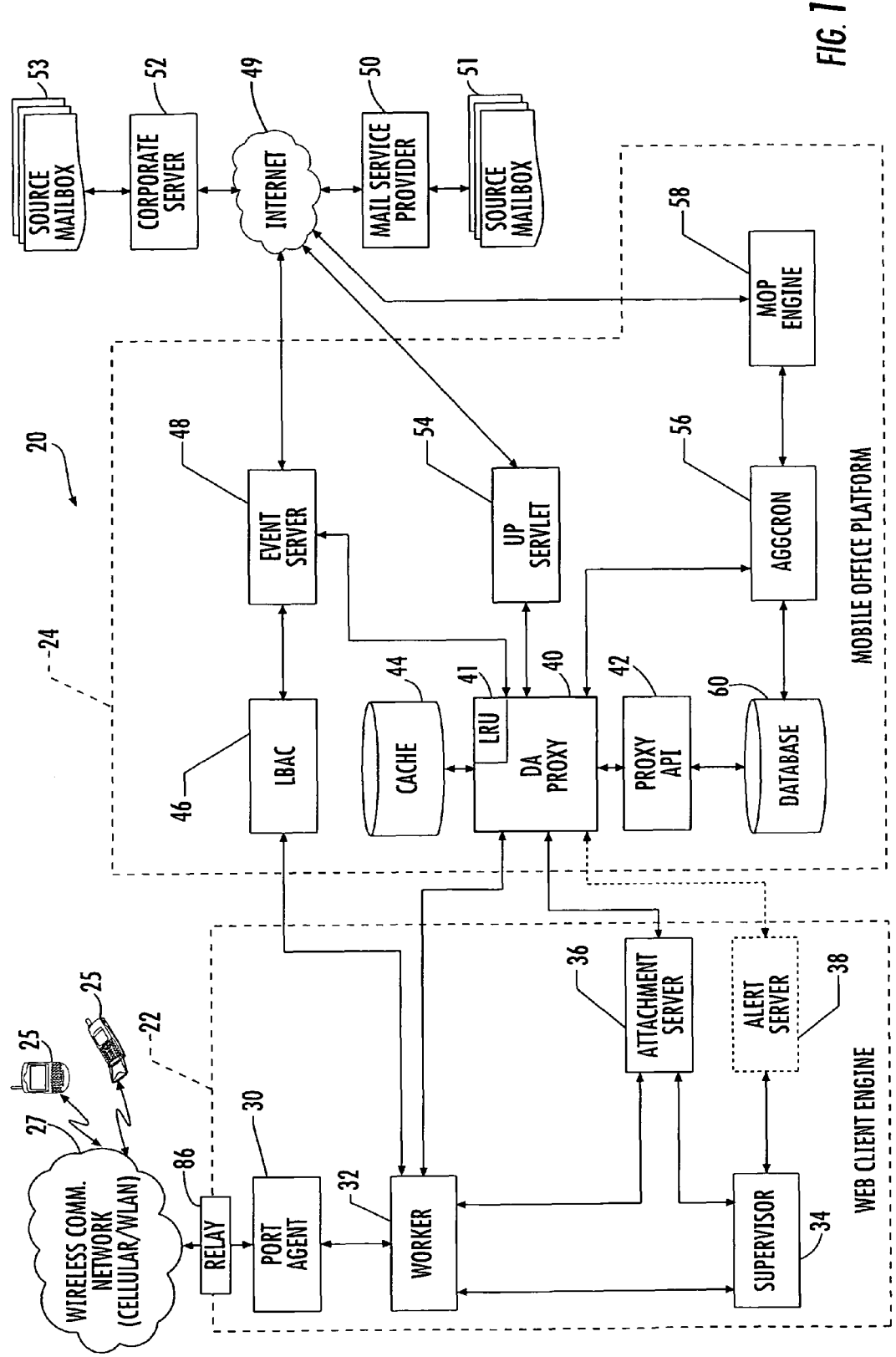
FIG. 1 is schematic block diagram of a direct access electronic mail (email) distribution and synchronization system.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

A system provisions an electronic (email) account of a user and allows access to an electronic mailbox from a remote device, such as a mobile wireless communications device, to retrieve email. A communications module receives email address parameters entered by the user and transmits a domain name system (DNS) query to the internet for returning at least one of any mail exchange (MX) and address (A)

records corresponding to the entered email address parameters of the user. A configuration module processes any returned MX and A records to determine whether any email address parameters entered by the user are valid before attempting to provision the email account of the user.

The configuration module is operative for determining that if MX and A records do not exist, email cannot be delivered or retrieved from the email account based on the entered email address parameters. The configuration module is also operative for informing the user that incorrect data has been entered, and provisioning of the email account cannot begin until correct email address parameters are entered. This configuration module can be operative for determining from the MX or A records a mail exchange server for an email domain name, which email is sent for the user email account.

The communications module can also receive a password from the user and can be operative for determining configuration parameters for accessing the email account of the user and attempting access to the user email account based on the configuration parameters and the received password. The configuration module can also be operative for obtaining a prioritized list of possible mail servers at which the user email account is to be accessed and attempting access to an email account based on priority. The configuration module is also operative for determining configuration parameters including at least one of a mail host, port, log-in name or password.

In another aspect, the configuration module is operative for generating a subset of possible configuration parameters by using heuristics of likelihood that a set of configuration parameters would be valid for accessing the electronic mailbox. A database can contain relevant configuration conventions that are sets of email expressions formed by symbols that symbolically represent the conventions used by email service providers for a set of configuration parameters. The configuration module can be operative for generating sets of possible configuration parameters that can be tried for accessing an electronic mailbox of a user. The communications module and configuration module can be supported at a mobile office platform and a direct access proxy can be used for accessing the electronic mailbox.

A method and computer-readable medium having computer-executable instructions with the described functions is also set forth.

Referring initially to FIG. 1, a direct access (DA) email distribution and synchronization system 20 allows direct access to different mail sources, allowing messages to be transferred directly to a mobile wireless handheld device from a source mailbox. As a result, different mail stores need not be used for integrated external source mail accounts, and a permanent copy of an email in a local email store is not required.

Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

The direct access system 20 enables email users or subscribers to have email from third party email services pushed to various mobile wireless communications devices 25. Users need not create a handheld email account to gain direct access to an existing external email account. The direct access system 20 may operate without performing aggregation as used in some prior art systems, in which emails are aggregated from multiple different source mailboxes to a single target mailbox. In other words, email need not be stored in an intermediate target mailbox, but instead may advantageously be accessed directly from a source mail store.

As illustrated in FIG. 1, the direct access system 20 illustratively includes a Web client (WC) engine 22 and a mobile office platform (MOP) 24. These Web client engine 22 and mobile office platform 24 operate together to provide users with direct access to their email from mobile wireless communications devices 25 via one or more wireless communications networks 27, for example. Both the Web client engine 22 and the mobile office platform 24 may be located at the same location or at separate locations, and implemented in one or more servers. The web client engine 22 illustratively includes a port agent 30 for communicating with the wireless communications devices 25 via the wireless communications network(s) 27, a worker 32, a supervisor 34, and an attachment server 36, which will be discussed further below. An alert server 38 is shown in dashed lines, and in one preferred embodiment, is not used, but could be part of the system in yet other embodiments.

The mobile office platform 24 illustratively includes a DA proxy 40, and a proxy application programming interface (API) 42 and a cache 44 cooperating with the DA proxy. The mobile office platform 24 also illustratively includes a load balance and cache (LBAC) module 46, an event server 48, a universal proxy (UP) Servlet 54, an AggCron module 56, a mobile office platform (MOP) engine 58, and a database (DB) engine 60, which will be discussed in further detail below. The Least Recently Used (LRU) cache 41 caches new messages, and can release messages and objects that were least recently used.

The supervisor 34 processes new mail notifications that it receives from the direct access proxy 40. It then assigns a job, in the form of a User Datagram Protocol (UDP) packet, to the least-loaded worker 32, according to the most recent UDP heartbeat the supervisor 34 has received. For purposes of this description, heartbeat is a tool that monitors the state of the server. Additionally, the supervisor 34 will receive a new service book request from the direct access proxy 40 to send service books to the mobile wireless communication device for new or changed accounts. A service book can be a class that could contain all service records currently defined. This class can be used to maintain a collection of information about the device, such as connection information or services, such as an email address of the account.

The worker 32 is an intermediary processing agent between the supervisor 34 and the port agent 30, and responsible for most processing in the Web client engine 22. It will retrieve e-mail from a universal proxy 54, via a direct access proxy, and format e-mail in Compressed Multipurpose Internet Mail Extension (CMIME) as a type of Multipurpose Internet Mail Extension, and send it to the port agent 30, for further processing. Its responsibilities include the following tasks: (1) messages sent to and received from the handheld; (2) message reply, forward and more requests; (3) Over The Air Folder Management operation (OTAFM); (4) attachment viewing; and (5) service book.

The port agent 30 acts as a transport layer between the infrastructure and the rest of the Web client engine 22. It is responsible for delivering packets to and from the mobile wireless communications device. To support different integrated mailboxes with one device, more than one service book can be used, and each service book can be associated with one integrated mailbox. A port agent 30 can include one Server Relay Protocol (SRP) connection to a relay, but it can also handle multiple SRP connections, and each connection may have a unique Globally Unique Identifier (GUID) associated with a service book. The attachment server 36 provides service for document/attachment conversion requests from workers 32.

The direct access proxy 40 provides a Web-based Distributed Authoring and Versioning (WebDAV) interface that is used by the worker 32 to access account and mailbox information. This provides functionality to create, change and move documents on a remote server, e.g., a Web server. The direct access proxy 40 typically will present an asynchronous interface to its clients. The LBAC module 46 is used by a notification server and the Web client engine 22 components to locate the proper DA proxy for the handling of a request. The universal proxy Servlet 54 abstracts access to disparate mail stores into a common protocol. The event server 48 responds to notifications of new messages from corporate servers 52 and/or mail service providers 50, which may be received via the Internet 40, for example. The notifications are communicated to the direct access proxy 40 by the AggCron module 56 and the event server 48 so that it may initiate checking for new mail on source mailboxes 51, 53 of the mail service providers 50 and/or corporate servers 52. The proxy API can be a Simple Object Access Protocol (SOAP) Daemon 42 and is the primary interface into a database 60, which is the primary data store for the mobile office platform 24. The AggCron module 56 may also periodically initiate polling for new messages as well.

Figure 2:
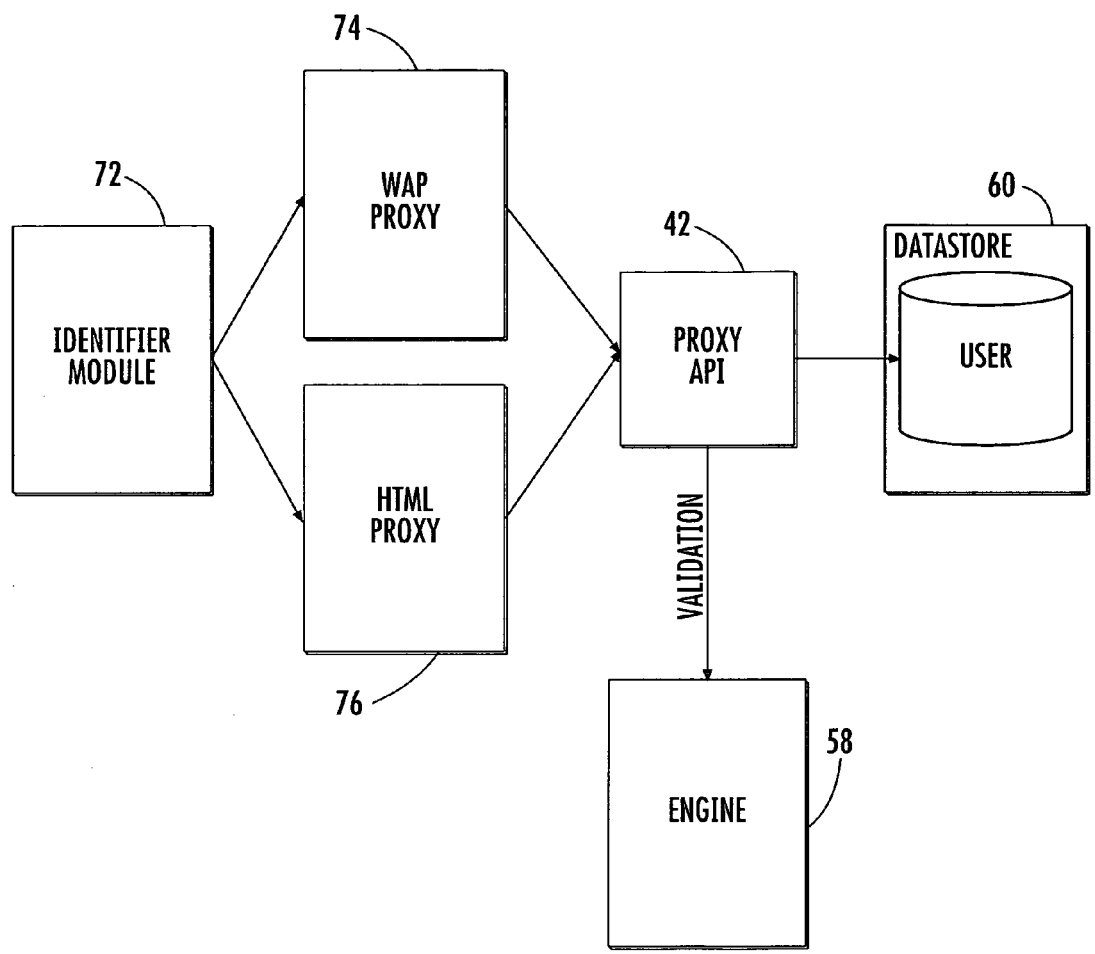
FIG. 2 is a schematic block diagram of an exemplary embodiment of user interface components of the direct access proxy of the system of FIG. 1.

FIG. 2 is a high-level block diagram showing user interface components of the direct access proxy 40. More particularly, the direct access proxy 40 illustratively includes an identifier module 72 with various downstream proxy modules for different communication formats, such as a Wireless Application Protocol (WAP) proxy module 74 and a Hypertext Markup Language (HTML) proxy module 76. Of course, it will be appreciated by those skilled in the art that other types of proxy modules for other communications formats may also be used.

The identifier module 72 provides a centralized authentication service for the direct access system 20 and other services. An authentication handshake may be provided between an ID service and direct access system 20 to ensure that users have the proper credentials before they are allowed access to the direct access system 20. The ability to switch from managing a Web client to a direct access system, or vice versa, may occur without requiring the user to re-enter any login credentials. Any Web client and direct access may share session management information on behalf of a user.

The WAP proxy 74 provides a wireless markup language (WML)-based user interface for configuring source mailboxes with the mobile office platform 24. The HTML proxy 76 provides an HTML-based user interface for configuring of source mailboxes in the MOP 24. The proxy API 42 (SOAP Daemon) is the primary interface into the database 60. The engine 58 is a protocol translator that connects to a source mailbox to validate configuration parameters. The database 60 is the primary user data store for the mobile office platform 24.

Figure 3:
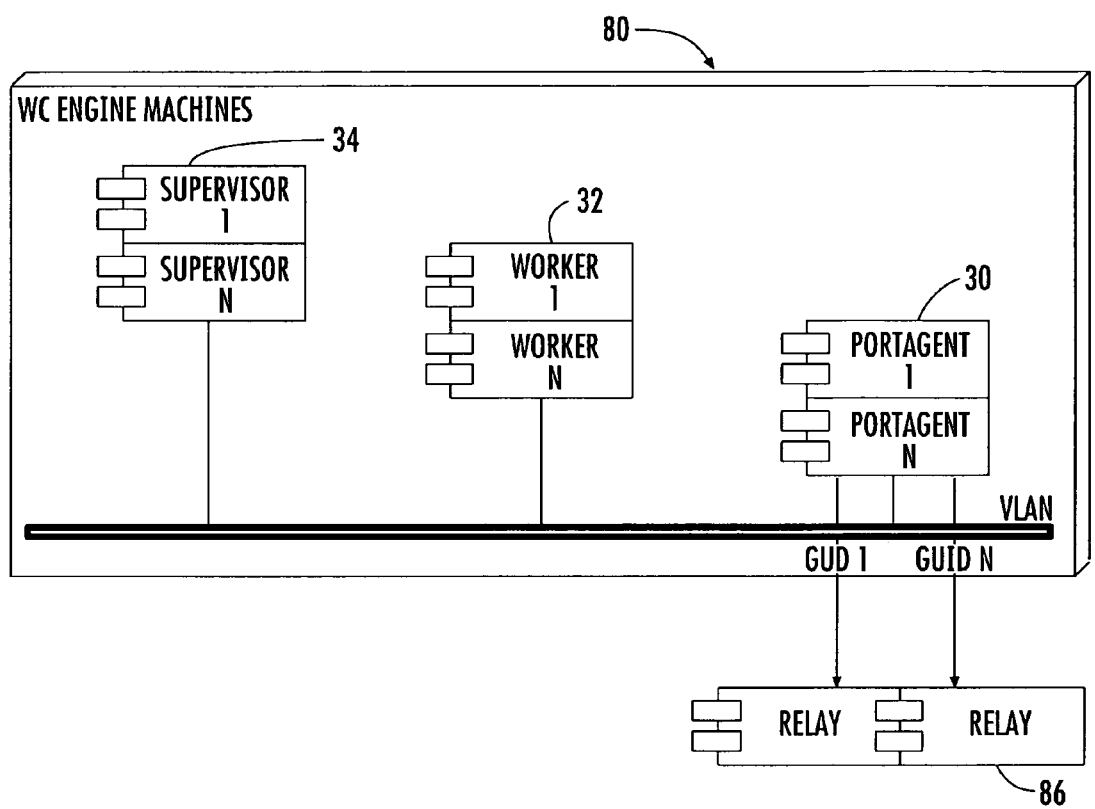
FIG. 3 is a schematic block diagram of an exemplary embodiment of the Web client engine of the system of FIG. 1.
Figure 4:
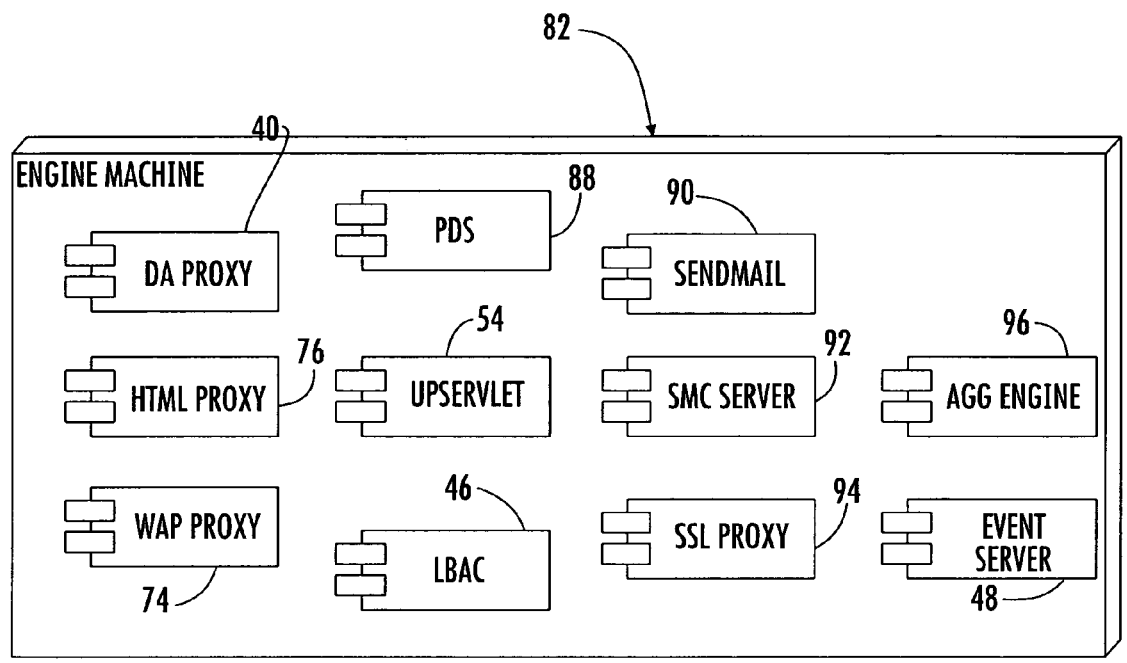
FIG. 4 is a schematic block diagram of an exemplary embodiment of the mobile office platform engine machine for use in the system of FIG. 1.
Figure 5:
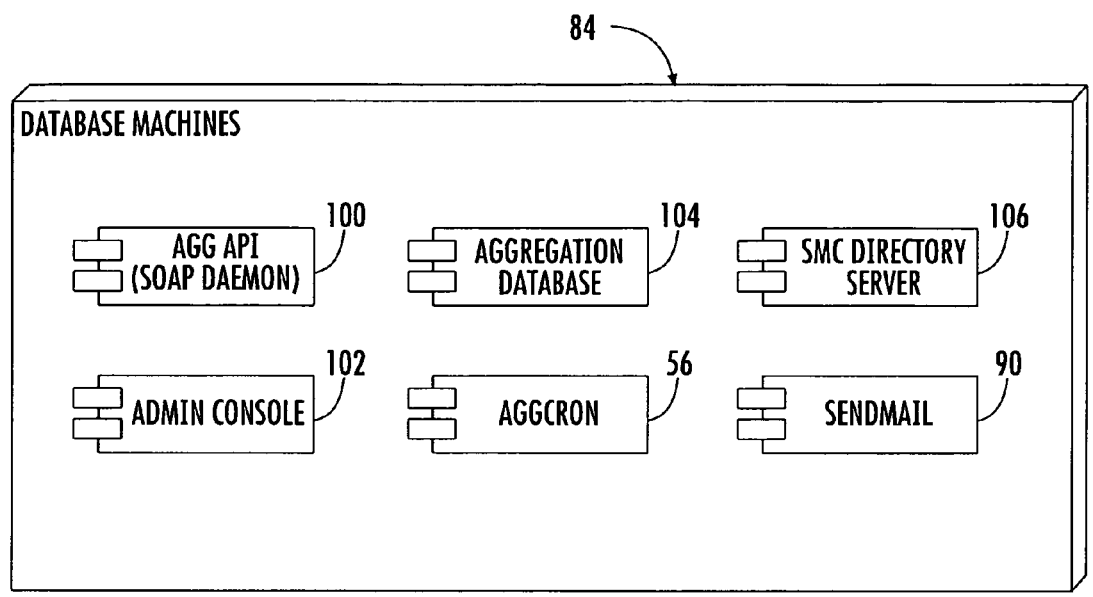
FIG. 5 is a schematic block diagram of an exemplary embodiment of the database module of the system of FIG. 1.

FIGS. 3, 4 and 5 illustrate respective Web client engine machines 80 (FIG. 3), an engine machine 82 (FIG. 4), and database machine 84 (FIG. 5). The Web client engine machine 80 illustratively includes the supervisors 34, workers 36, and port agents 38. Relays 86 cooperate with the port agents 38 using a GUID.

The engine machine 82 illustratively includes a direct access proxy 40, HTML proxy 76, WAP proxy 74, PDS module 88, UP Servlet 54, LBAC module 46, a sendmail module 90, an secure mail client (SMC) server 92, a secure sockets layer (SSL) proxy 94, an aggregation engine 96, and event server 48. The SMC server 92 cooperates with corresponding SMC modules resident on certain corporate networks, for example, to convey email data between the mobile office platform 24 and source mailboxes. The database machine 84 may include an aggregation application programming interface (API) 100 as a SOAP Daemon, an administration console 102, an aggregation database 104, the AggCron module 56, an SMC directory server 106, and a send mail module 90.

The various components of the Web client engine 22 may be configured to run on different machines or servers. The component binaries and configuration files may either be placed in a directory on the network or placed on a local disk that can be accessed to allow the appropriate components to run from each machine. In accordance with one exemplary implementation, deployment may include one supervisor, two workers, and one port agent for supporting 30,000 external source mailboxes, although other configurations may also be used. Actual production deployment may depend on the results of load, performance and stress testing, as will be appreciated by those skilled in the art.

For the mobile office platform 24 direct access components, modules and various functions, machines are typically installed in two configurations, namely engine machines (FIG. 4) and database machines (FIG. 5). While these machines may have all of the above-described components installed on them, not all of these components need be active in all applications (e.g., aggregation may be used with systems that do not support push technology, etc.). Once again, actual production deployment may depend on the results of load, performance and stress testing.

The mobile office platform 24 architecture in one known technique advantageously uses a set of device/language-specific eXtensible Stylesheet Language (XSL) files, which transform application data into presentation information. In one non-limiting example, a build process takes a non-localized XSL and generates a localized XSL for each supported language. When the XSL is used, it is "compiled" in memory and cached for repeated use. The purpose of pre-localizing and caching the templates is to reduce the CPU cycles required to generate a presentation page.

Branding may also be performed. Initially, a localized XSL may build a WAP application to access aggregated email accounts. A WAP proxy application may be localizable and support multiple WAP devices. For each logical page of an application, a device-specific XSL may be created, which may be localized for each language/country supported. This rendering scheme may support not only WAP devices, but also SMTP, HTML and POP proxies, for example. In branding, each page of a given application may be customized for each different brand.

The branding of a page may be accomplished through XSL imports, including the use of a Java application programming interface (API) for XML processing (JAXP) feature to resolve the imports dynamically. This need not require that each combined page/brand template be compiled and cached. By way of example, in a sample template directory, first and second pages for a single language/country may be combined with branded counterparts to generate a plurality of distinct template combinations. It is also possible to profile memory requirements of an application by loading templates for a single language, device/application and brand. An HTML device may include a set of templates that are large compared to other devices.

In one known technique, the mobile office platform 24 advantageously builds processes and takes non-localized files and language-specific property files and combines them to make each non-localized XSL into an XSL for each supported language. A separate XSL for each language need not be used, and the language factor may be removed from the memory usage equation. A JAXP API may be used to extend XSL with Java classes. The extensions may take various forms, for example, including extension elements and extension functions. A template may be transformed by creating and initializing an extension object with a locale and passing an object to a transformer. The system can remove multiple imports and use less memory. HTML templates can use template importing to enable template reuse, much like Java classes, and reuse other Java classes through a mechanism like derivation or importing.

In the direct access system 20, users receive email on their mobile wireless communications devices 25 from multiple external accounts, and when replying to a received message, the reply-to and sent-from address integrity is preserved. For example, for a user that has an integrated Yahoo! account (user@yahoo.com) and a POP3 account (user@pop3.com), if they receive an email at user@yahoo.com, their replies generated from the device 25 will appear to come from user@yahoo.com. Similarly, if a user receives an email at user@pop3.com, their replies will appear to come from user@pop3.com.

Selection of the "sent from" address is also available to a user that composes new messages. The user will have the ability to select the "sent from" address when composing a new message. Depending on the source mailbox type and protocol, the message may also be sent through the source mail service. This functionality can be supported by sending a configuration for each source mailbox, for example, as a non-limiting example, a service book for each source mailbox 51, 53 to the mobile wireless communications device 25.

As noted above, a service book is a class that may include all service records currently defined. This class may be used to maintain a collection of information about the device, such as connection information. The service book may be used to manage HTTP connections and mail (CMIME) information such as account and hierachy. At mobile wireless communications devices 25, a delete service book request may be sent when a source mailbox 51, 53 is removed from the account. The service book may also be resent to the device 25 with a viewable name that gives the user some indication that the selection is no longer valid.

A sent items folder may also be "synchronized." Any device-originated sent messages may be propagated to a source account and stored in a sent mail folder, for example. Also, messages deleted on the device 25 may correspondingly be deleted from the source mailbox 51, 53. Another example is that device-originated marking of a message as read or unread on the device 25 may similarly be propagated to the source mailbox 51, 53. While the foregoing features are described as source-dependent and synchronizing one-way, in some embodiments certain synchronization features may in addition, or instead, propagate from the source mailbox/account to the handheld device, as will be appreciated by those skilled in the art.

When available, the mail service provider or corporate mail server may be used for submission of outgoing messages. While this may not be possible for all mail service providers or servers, it is preferrably used when available as it may provide several advantages. For example, subscribers to AOL will get the benefit of AOL-specific features like parental controls. Furthermore, AOL and Yahoo users, as non-limiting examples, will see messages in their sent items folder, and messages routed in this manner may be more compliant with new spam policies such as Sender Policy Framework (SPF) and Sender Id. In addition, messages sent via corporate mail servers 52 will have proper name resolution both at the global address list level and the personal level. It should be understood, however, that the use of the mail service provider 50 to deliver mail may be dependant on partner agreements and/or protocol, depending upon the given implementation.

The architecture described above also advantageously allows for features such as on-demand retrieval of message bodies and attachments and multiple folder support. Morever, a "this-is-spam" button or indicator may be used allowing company labels and other service provider-specific features when supported by an underlying protocol, as will be appreciated by those skilled in the art.

One particular advantage of the direct access system 20 is that a user need not configure an account before integrating additional accounts. However, a standalone email address may be used, and this address advantageously need not be tied to a mailbox size which the subscriber is required to manage. For example, the email account may be managed by an administrator, and any mail could be purged from the system after a pre-determined period of time (i.e., time-based auto-aging with no mailbox limit for all users).

Additionally, all aspects of any integrated email account creation, settings and options may advantageously be available to the user from their mobile wireless communications device 25 Thus, users need not visit an HTML site and change a setting, create a filter, or perform similar functions, for example. Of course, an HTML site may optionally be used.

As a system Internet email service with the direct access system 20 grows, ongoing emphasis may advantageously be placed on the administrative site to provide additional information to carrier administrators, support teams, and similar functions. However, in some instances a mail connector may be installed on a personal computer, and this functionality may not always be available from the mobile wireless communications device.

The Web client engine 22 may advantageously support different features including message to handheld (MTH), message from handheld (MFH), forward/reply a message, request to view more for a large message (e.g., larger than 2K), request viewing message attachment, and over the air folder management (OTAFM). These functions are explained below.

For an MTH function, each email account integrated for a user is linked with the user device through a Web client service book. For each new message that arrives in the Web client user mailbox, a notification that contains the new message information will typically be sent to a Web client engine supervisor component (FIG. 3), which in turn will assign the job to an available worker with the least load in the system. The chosen worker 32 will validate the user information and retrieve the new message from the user source mailbox and deliver it to the user device.

In an MFH function, MFH messages associated with a Web client service book are processed by the Web client engine 22 and delivered to the Internet 49 by the worker 32 via the simple mail transfer protocol (SMTP) or native outbox. If a user turns on the option to save the sent message to the sent items folder, the direct access proxy will save a copy of the sent message to this folder.

In a Forward/Reply/More function, the user can forward or reply an MTH or MFH message from the mobile wireless communications device 25 as long as the original message still existed in the direct access proxy cache or in user mailbox. For MTH, the worker 32 may send the first 2K, for example, or the whole message (whatever is less) to the user device. If the message is larger than 2K, the user can request MORE to view the next 2K of the message. In this case, the worker 32 will process the More request by retrieving the original message from the user source mailbox, and send back the 2K that the device requests. Of course, in some embodiments more than 2K of message text (or the entire message) may be sent.

In an attachment-viewing function, a user can view a message attachment of a popular document format (e.g., MS Word, MS Power Point, MS Excel, Word Perfect, PDF, text, etc.) or image format (GIF, JPEG, etc). Upon receiving the attachment-viewing request, which is implemented in a form of the More request in this example, the worker 32 can fetch the original message from the user source mailbox via the direct access proxy, extract the requested attachment, process it and send result back to the user device. The processing requires that the original message has not been deleted from the user Web client mailbox.

In the save sent message to sent items folder function, if the user turns this option on, the worker 32 places a copy of each MFH message sent from the user device in the user sent items folder in the mailbox. In over the air folder management, the Web client OTAFM service maintains any messages and folders in the user mailbox synchronized with the user device over the air.

Whenever a message in the user source mailbox is Moved/Deleted, the associated message on the device may also be Moved/Deleted accordingly, and vice-versa. When a message is Moved/Deleted on the device, the associated message in the user Web client mailbox may also be Moved/Deleted accordingly. Similarly, when a folder is Added/Removed/Renamed from the user Web client mailbox, the associated folder on the device may be Added/Removed/Renamed, and vice-versa.

The system 20 may advantageously support different subsets of various messaging features. For example, in the message to handheld function, the mobile office platform 24 may be responsible for connecting to the various source mailboxes 51, 53 to detect new emails. For each new mail, a notification is sent to the Web client engine 22 and, based on this notification, the supervisor 34 chooses one of the workers 32 to process that email. The chosen worker will fetch additional account information and the contents of the mail message from the direct access proxy 40 and deliver it to the user device 25.

In a message sent from handheld function, the MFH could be given to the direct access proxy 40 from the Web client worker 32. In turn, the mobile office platform 24 delivers a message to the Internet 49 by sending through a native outbox or sending it via SMTP. It should be understood, however, that the native outbox, whenever possible, may provide a better user experience, especially when taking into account current anti-spam initiatives such as SPF and sender Id.

In a message deleted from handheld function, when a message is deleted from the device 25, the Web client engine 22 notifies the mobile office platform 24 via the direct access proxy 40. As such, the mobile office platform 24 can delete the same message on the source mailbox.

When handling More/Forward/Reply/Attachment viewing requests, the Web client worker 32 may request an original mail from the direct access proxy 40. It will then process the request and send the results to the mobile wireless communications device 25. The architecture may additionally support on-demand retrieval of message parts and other upgrades, for example.

Upon the integration of a new source mailbox 51, 53, the service book notification from the alert server 38 may be sent to the supervisor 34, which assigns this notification to a worker 32 for sending out a service record to the device. Each source mailbox 51, 53 may be associated with a unique service record. In this way, each MFH message is linked with a source mailbox 51, 53 based on the service record on the device.

The system 20 may also poll the integrated external mailboxes periodically to check for new mail and to access any messages. The system 20 may further incorporate optimizations for polling bandwidth from an aggregation component allowing a quick poll. The system 20 can also advantageously support a large active user base and incorporate a rapidly growing user base.

The topology of load balancing can be based on the size of a component's queue and its throughput. These load statistics can be monitored by a mechanism in one example called the UDP Heartbeat, as described before. If a component is overloaded or has a large queue size, the component will have less chance to get an assigned job from other components. In contrast, a component will get more assigned jobs if it completes more jobs in the last few hours than other components. With this mechanism, the load could distribute over heterogeneous machine hardware, i.e., components running on less power machines will be assigned fewer jobs than those on machines with more power hardware.

General load balancing for any mobile office platform components can be accomplished through the use of a load balancer module, for example, a BIG-IP module produced by F5 Networks of Seattle, Wash. BIG-IP can provide load balancing and intelligent layer 7 switching, and can handle traffic routing from the Internet to any customer interfacing components such as the WAP and HTML proxies. The use of a BIG-IP or similar module may provide the application with pooling capabilities, fault tolerance and session management, as will be appreciated by those skilled in the art.

Typically, access to a single source mailbox 51, 53 can be from a single direct access proxy 40 over a persistent connection. Any requests on behalf of a particular user could persist to the same machine in the same direct access clustered partition. As certain components are system-wide and will be handling work for users across many partitions, these components can be designed to determine which direct access partition to communicate with on a request-by-request basis.

The load balancer and cache (LBAC) 46 may support this function. The LBAC 46 is a system-wide component that can perform two important functions. The first of these function is that it provides a mapping from the device PIN to a particular direct access proxy 40, while caching the information in memory for both fast access and to save load on the central database. Secondly, as the direct access proxy 40 will be run in clustered partitions, the LBAC 46 may distribute the load across all direct access proxies within any partition.

The LBAC 46 can be formed of different components. For example, the code which performs the load balancing can be an extended version of a secure mail connector. The code can also perform lookups to the central database and cache the results (LBAC).

In one non-limiting example, when a worker requires that a direct access proxy 40 perform work, it provides the LBAC 46 with a device PIN. The LBAC 46 will discover which partition that PIN is associated with by looking in its cache, or retrieving the partition identifier from a central database (and caching the result). Once the partition is known, the LBAC 46 then consults its cache to see which direct access proxy in that partition has been designated to handle requests for that PIN.

If no mapping exists, the LBAC requests the PDS to create a new association on the least loaded DA proxy 40 (again caching the result). Finally, the LBAC 46 responds to the worker 32 with the connection information for the proper direct access proxy to handle that particular request.

The secure mail connector 88 may run in failover pairs, where one is an active master and the other is a secondary standby. Internal data structures may be replicated in real-time from the master to the standby. Multiple LBACs 46 can be run for scalability and fault tolerance, but typically would require an external connection balancing component, such as the BIG-IP component as explained before.

A receiving component in the Web client engine 22 saves the job that has been assigned to it from other components to a job store on the disk before processing. It can update the status of the job and remove the job from the job store when the job processing is completed. In case of component failure or if the process is restarted, it can recover the jobs from the job store and, based on the current statuses of these jobs, continue processing these jobs to the next state, saving the time to reprocess them from the beginning.

Any recovery from the standpoint of MTH/MFH can be achieved through current polling behavior and on the Web client engine 22 recovery mechanisms. From within the mail office platform components, until a message has been successfully delivered to a Web client engine 22, that message is not recorded in the partition database 60. During the next polling interval, the system can again "discover" the message and attempt to notify the Web client engine 22. For new mail events, if an event is lost, the system can pick up that message upon receiving the next event or during the next polling interval. For sources supporting notifications, this interval could be set at six hours, as one non-limiting example. For messages sent from the Web client engine 22, and for messages that have been accepted by the Web client engine, recovery can be handled by different Web client engine components.

The Web client engine 22 may advantageously be horizontally and vertically scalable. Multiple supervisors 34 can be registered/configured with direct access proxies 40 to provide the distribution of the notification load and the availability of engine service. Multiple workers 32 and port agents 30 can run on the same machine or across multiple machines to distribute load and achieve redundancy. As the number of users grows, new components can be added to the system to achieve high horizontal scalability.

It is possible for a new component to be added to or removed from the system automatically without down time. Traffic can automatically be delegated to a new component and diverted away from failed components. Each component within the mobile office platform 24 can be deployed multiple times to achieve horizontal scalability. To achieve vertical scalability, each mobile office platform 24 component can be a multi-threaded process with a configurable number of threads to scale under heavy load. Pools of connections can be used to reduce the overhead of maintaining too many open connections.

The embodiments as described advantageously set forth a system and method in which the system can send a domain name system (DNS) query to the Internet upon receipt of a user email that contains email address parameters entered by the user. In one aspect, MX records corresponding to the email address parameters of the user can be returned, which are used as a starting point for determining configuration parameters for accessing the email account of the user and retrieving user email. In prior applications, the system would run through a series of possible email server configurations to determine access to a source mailbox. For example, if a user provided an email address of Sally@somedomain.com, the system would try a series of possible server domain names, for example, mail.somedomain.com, pop.somedomain.com, etc. until the system finds one that works. If the system goes through the entire list of possibilities to validate an account, this can result in significant delays. Also, with the increase in "vanity" domains, using the ending of the email address might not lead to the actual server where the account is hosted. In addition, certain email actually resolves to other service provider email systems, e.g., a Verizon.com addresses resolved to mail.yahoo.com. Thus, the current approach may not always find the appropriate address of the mail server, and the user may have to wait a significant time while this process takes place only to have the process fail in the end.

In the application as described, the MX records can be used as a starting point for determining configuration parameters for accessing a user email account. The MX records can also be used to aid in the "guessing" logic, which is described later. A user domain name can be checked against the MX record list to see if there is a match, and if not, then the system declares a failure without trying to authenticate.

In one non-limiting aspect, when provisioning a new email account, the mail exchange (MX) and address (A) records corresponding to the entered email address parameters of the user are returned. A configuration module processes MX or A records to determine whether any email address parameters entered by the user are valid before attempting to provision the email account of the user. The email address parameters could be an email address, or email address and password as non-limiting examples.

Figure 6:
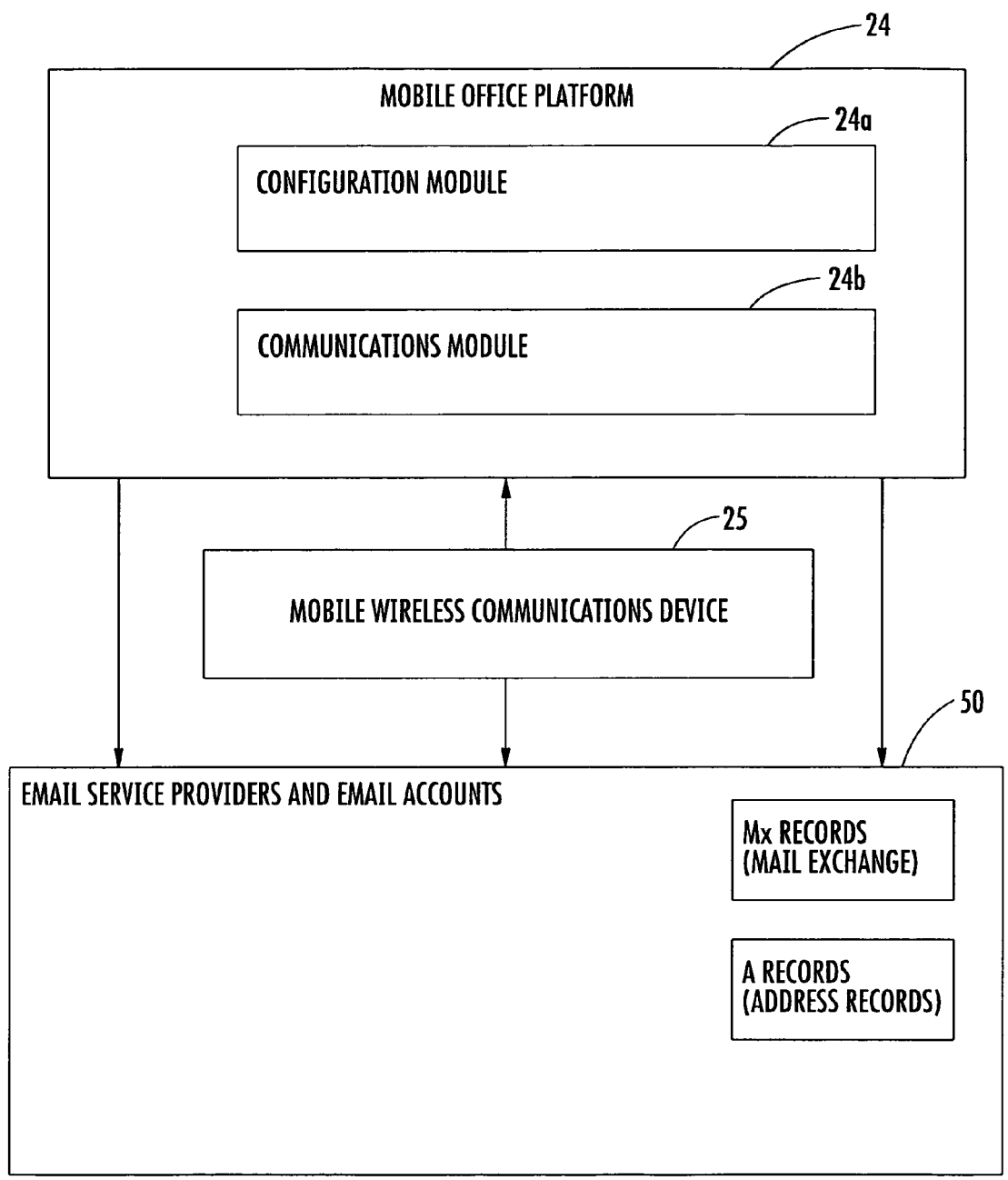
FIG. 6 is a block diagram showing functional components of a configuration module and communications module that can be operative as part of a mobile office platform.

FIG. 6 shows basic components of the mobile office platform 24 that includes functional components of a configuration module 24a and communications module 24b, and operative with the email service providers 50 having email accounts and MX records and A records. A mobile wireless communications device 25 is operative with mobile office platform 24 and email service provider 50 with email accounts. The configuration module 24a and communications module 24b are operative components with general functional and descriptive names for one or more components as described before relative to FIGS. 1-5.

A mail exchange (MX) record can be an entry in a domain name database that identifies a mail server that is responsible for handling electronic mail for the domain name. Different MX records can be entered for any single domain name that is using more than one mail server. Priority can be obtained by a preference number, indicating the order in which the mail servers could be used. This would allow primary and back-up mail servers. Thus, an MX record maps a domain name to a list of mail exchange servers for that domain.

Another type of mapping from a name to an IP address is an address (A) record, for example, the host name to an IP address mapping. Typically, in the priority of MX records, the smallest preference number has the highest priority.

It should be understood that although the DNS system supports different types of record systems, the A record is typically a straight mapping between a name and one or more IP addresses. The MX record is usually used for routing email traffic, for example, routing emails of a particular domain name to a particular server that can be different from what is in the A records. Typically, the MX record is a good indicator for where the email domain name server is routing mail and can be used not only to check a user domain name against the MX record to see if a match occurs, but also to improve the guessing logic as will be explained below. If the MX record does not match, there could be a failure and the system may not try to authenticate, but would ask a user to re-enter the particular email address parameters. The system and method could take a portion after the "@" and do a DNS query on the internet for MX and A records. A number of MX records can be pulled and the best one is picked to accomplish the provisioning and determine which server to pull mail from, especially when a company has several servers with different MX records acting as back-ups. This is important for vanity domain names. If there is an A record, there may or may not be additional insight on provisioning, yet in some instances, the A record can be used for determining a valid address. It is also possible to make several educated guesses as explained below. Otherwise, the user is told it is not a valid address.

Figure 7:
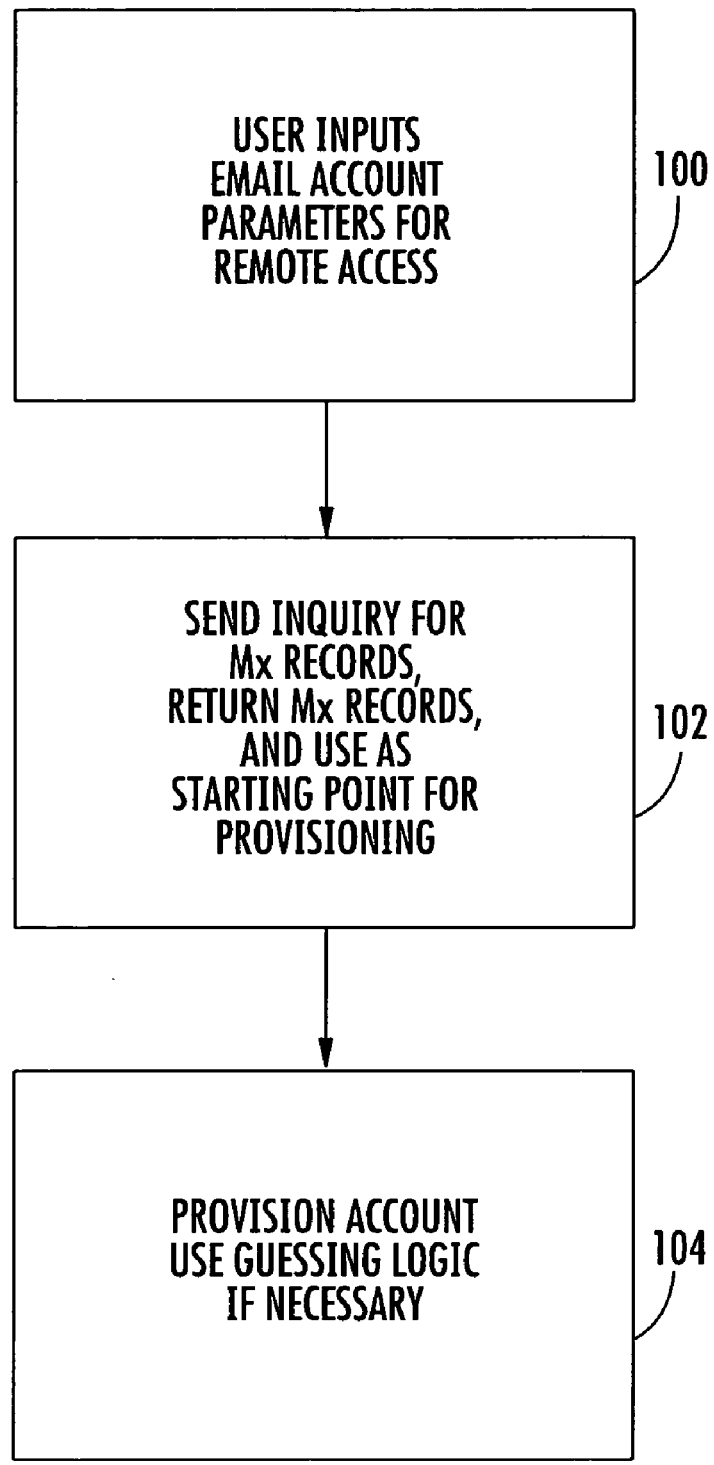
FIG. 7 is a high-level flowchart as an example of the process used for provisioning an email account using MX records.

FIG. 7 is a high-level flowchart illustrating an example of a process used for provisioning an electronic mail (email) account of a user for allowing access to an electronic mailbox from a remote device to retrieve email. The process uses MX records as a starting point for determining configuration parameters and accessing the email account of the user to retrieve user email.

As shown at block 100, a user inputs email address parameters during a provisioning process for typical remote access capabilities as described above. Upon receipt of the email address parameters, such as an email address and log-in password, the communications module transmits a DNS query to the internet for returning MX records corresponding to the email address parameters of the user. The MX records are returned and used as a starting point for determining configuration parameters for accessing the email account of the user to retrieve user email (block 102). If MX records or A records are returned for the user domain, a failure could occur and provisioning may not continue. The MX records can also be used with guessing logic, if necessary or desired (block 104).

It should be understood that in one aspect of a preferred and illustrated embodiment, there are two steps. In a first step, the user domain is used to retrieve a list of MX records. If a list of MX records comes back empty, then the user domain is used to retrieve a list of A ("address") records as a second step. If the list of A records for the domain is also empty, the system could declare a failure without trying to authenticate. A database could include a table having a row for each ISP, operative with the guessing and other logic explained below.

Typically, the configuration module 24a is operative for determining from the MX records a mail exchange server for an email domain name to which email is routed for the user email account. A prioritized list of possible mail servers can be obtained from the MX records to which the user email account is to be accessed and access to an email account can be based on priority. Configuration parameters could include the mail host, port, log-in name or password.

The configuration module 24a is operative for generating a subset of possible configuration parameters by using heuristics of likelihood that a set of configuration parameters would be valid for accessing an electronic mailbox. A database can contain relevant configuration conventions that are sets of email expressions formed by symbols that symbolically represent the conventions used by email service providers for a set of configuration parameters. The configuration module can be operative for generating sets of possible configuration parameters that can be tried for accessing an electronic mailbox of a user.

Figure 8:
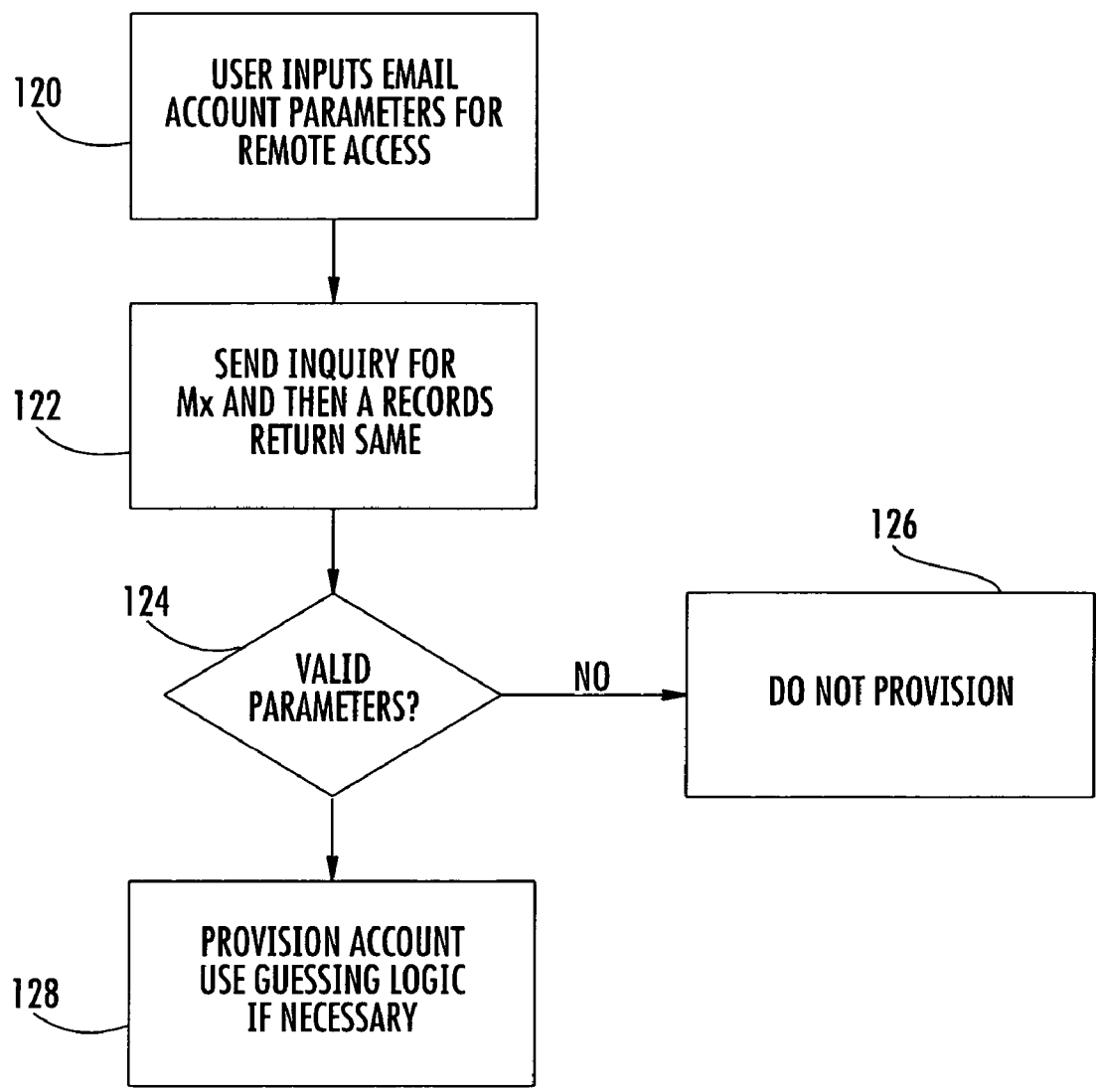
FIG. 8 is a high-level flowchart showing an example of the process used for provisioning an email account using mail exchange (MX) and address (A) records.

FIG. 8 is a high-level flowchart as an example of a process used when both MX and A records can be returned. As shown at block 120, the user inputs email address parameters to begin the process of provisioning the email account for remote access. The system 24 sends an inquiry first for MX records, and if no confirmation that the email address parameters are valid, the A records can be checked (block 122). Although this description will proceed relative to first receiving MX records, both MX and A records could be returned at the same time, and in some embodiments is preferred. A check is made for valid email address parameters (block 124). If not valid, the provisioning process steps (block 126). If these are valid email address parameters, provisioning continues and guessing logic can be used (block 128).

Typically, the configuration module 24a will process any returned MX or A records to determine whether any email address parameters entered by the user are valid before attempting to provision the email account of the user.

The configuration module 24a is operative for determining that if no MX or A records exist, email cannot be delivered or retrieved from the email account based on the entered email address parameters. Typically the configuration module can inform the user that incorrect data has been entered and provisioning of the email account cannot begin until correct email address parameters are entered. Similarly with the MX record example set forth above, a different mail exchange server can be determined and a prioritized list of possible mail servers obtained. There now follows details of an example of guessing logic that can be used.

Figure 9:
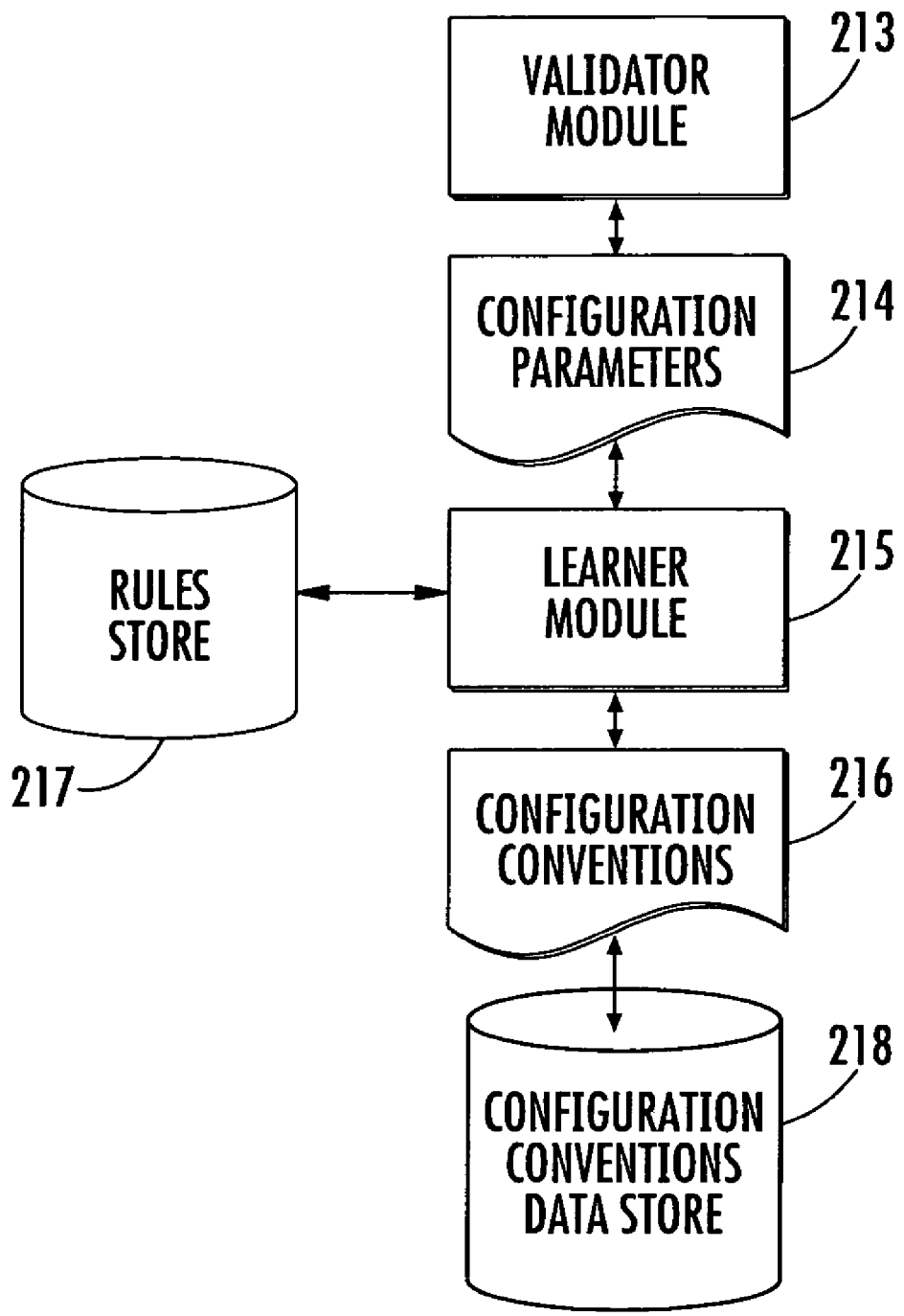
FIG. 9 is a block diagram of a system for learning mailbox configuration conventions.

Guessing logic as will be described can be used as an aid for provisioning an account. FIG. 9 illustrates a system for automatically learning conventions used by mail domains. The system is part of the intelligent server 211, which includes a validator module 213 that determines a valid set of configuration parameters 214. The server includes a learner module 215, which accepts the valid set of configuration parameters 214 and generates configuration conventions 216. A configuration conventions store 218 is operative as a database preferably part of the server, but could be separate. It stores the conventions for each mail domain. The learner module 215 is operative with a rules store 217 as a database of different rules.

The validator module 213 determines a valid set of configuration parameters 214 for a respective mailbox based on a limited number of configuration parameters provided by the user. In an example embodiment, the validator module 213 may try to access the respective mailbox using a set of best guesses (estimates) for the configuration parameters as provided by the service that invokes the validator module 213. In the example embodiment, if the access attempt fails, the validator module 213 may request additional information from the user until the validator module 213 has a valid set of configuration parameters. The validator module 213 accesses the mailbox being configured by using the access protocol relevant to the mailbox.

In an example embodiment, the validator module 213 would use POP to access a POP enabled mailbox to verify that the configuration parameters 214 are valid. In other example embodiments, the validator module 213 may use IMAP to access IMAP enabled mailboxes. As is obvious to those skilled in the art, there are many access protocols that may be used to access mailboxes. After attempting to validate the configuration parameters 214, the validator module 213 returns status information and the valid set of configuration parameters 214.

The learner module 215 accepts the configuration parameters 214 and generates the configuration convention 216 for the configuration parameters 214. The configuration convention 216 is a manner of formatting the conventions used for configuration parameters for storage in the configuration convention store 218. In an example embodiment, if the users email address is "john.smith@foo.com", and the login name parameter required by the relevant mail host is "jsmi", an expression within the configuration convention 216 for the login name parameter may be <FirstName(1)><LastName(3)>.

A variety of formats could be used in implementing a configuration convention 216. The learner module 215 may apply certain tests to the configuration parameters 214 to ensure that the configuration parameters 214 are credible. In an example embodiment, the learner module 215 will only learn conventions in cases where the mail host is in the same mail domain as the email address of the user, to avoid attempts by "hackers" to pollute the learned configuration conventions 216. Other tests are envisioned to ensure the integrity of the learned configuration conventions 216. The learner module 215 may also apply rules that are stored in the rules store 217. These rules may be based on business criteria or other relevant criteria. In an example embodiment, the rules may indicate that certain conventions are not to be learned for security reasons.

Configuration conventions 216 that are deemed acceptable by the learner module 215 are then stored in the configuration conventions store 218. In an example embodiment, the configuration conventions store 218 may include standard configuration conventions applicable to all domains, as well as one or more of the automatically learned configuration conventions 216 for each mail domain. Mail domains may have more than one associated configuration convention, as there may be multiple ways and protocols in which the mailbox on the mail domain may be accessed.

Services may then access the configuration conventions 216 from the configuration convention store 218 to generate a list of potential sets of configuration parameters when configuring access to one or more of the user mailboxes.

Based on empirical evidence, the vast majority of email providers adhere to a number of conventions when it comes to the configuration parameters used to access mailboxes. Almost all of the POP mail hosts in existence today are prefixed with "mail.", "pop.", or "pop3.". It is likely that a user with an email address of "john.smith@foo.com" would be able to access their POP-enabled mailbox through the host named "mail.foo.com", "pop.foo.com" or "pop3.foo.com". These conventions can be captured in a data store and it is possible for the service that requires access to the user's mailbox to use the conventions to generate potentially valid sets of configuration parameters. The server can then attempt to determine a valid set of configuration parameters that can be used to access the user's mailbox. The set of configuration parameters for the user's mailbox can be determined when the user only provides an email address and password. The system can also successfully determine the configuration parameters in most cases. As new conventions are introduced or are discovered, they may be easily added to the data store.

Figure 10:
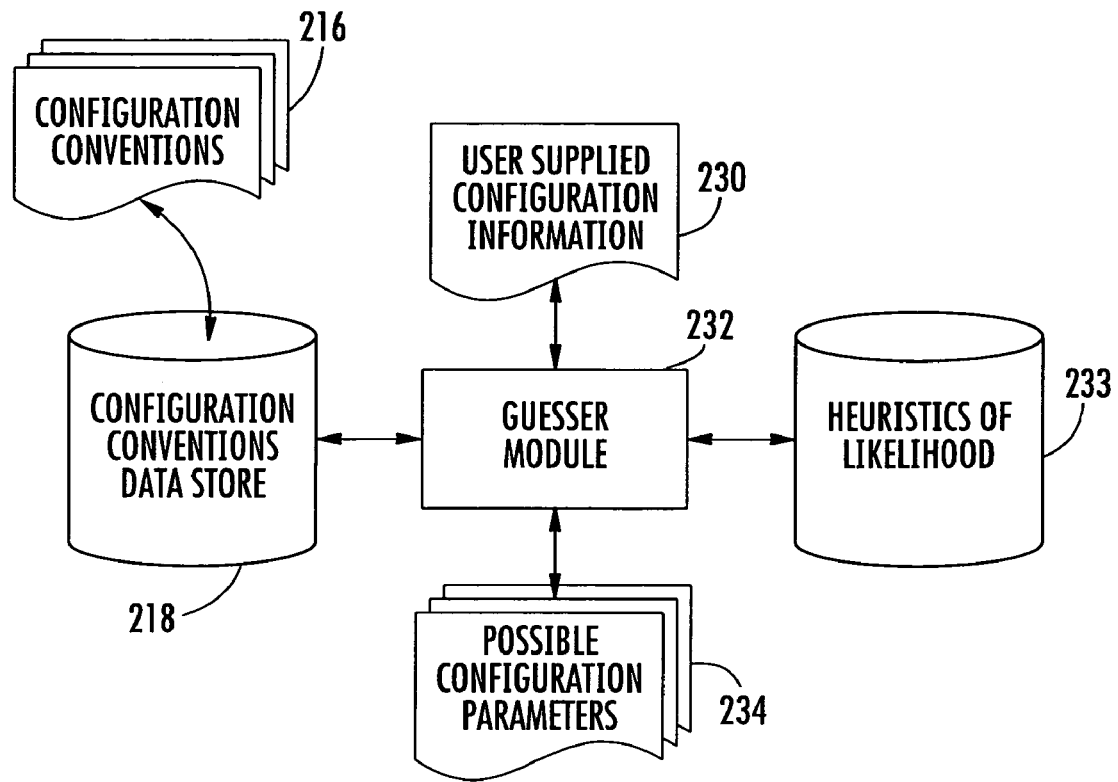
FIG. 10 is a block diagram of a system for determining configuration parameters.

A guesser or determination module 232 (FIG. 10) is part of the server 211 and operative as the mailbox interface module and generates possible sets of configuration parameters 234 based on user supplied configuration information 230, coupled with configuration conventions 216 stored in the configuration conventions data store 218. Services may then use the sets of configuration parameters 234 to determine the correct set of configuration parameters required to access the user's mailbox.

Figure 11:
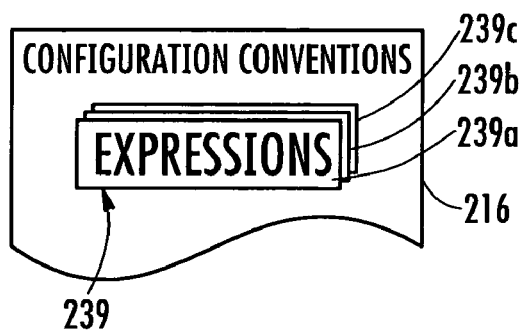
FIG. 11 is a block diagram showing details of configuration conventions using different expressions as a subset.

FIG. 11 shows further details of the configuration conventions 216. It should be understood that configuration conventions are sets of e-mail expressions formed by symbols, which can also be literals, such as a port number. In an example embodiment, a configuration convention 216 may comprise an expression for the server name parameter and an expression for the login name parameter. If, in the example embodiment, the email provider uses the login name "jsmith" and the mail domain "mail.foo.com" given an email address "john.smith@foo.com", the login name expression in the configuration convention 216 may be <FirstName(1)><LastName>, while the server name expression may be "mail.<MailDomain>". In this example, the number in brackets within the expression <FirstName(1)>, represents the number of characters to be used from the parameter <FirstName>, ie. "j". As is obvious to one skilled in the art, a variety of different symbolic representations may be used to represent the conventions for configuration parameters. The configuration conventions data store 218 stores the configuration conventions 216. As new conventions are introduced or discovered, they may be easily added to the configuration conventions store 218.

The module 232 generates the sets of possible configuration parameters 234 based on user-supplied information 230, and relevant configuration conventions 216 from the configuration conventions data store 218. In many cases, the users email address provides sufficient information to be able to generate an accurate set of configuration parameters. In the example embodiment, given the email address "jane.doe@foo.com", the module 232 would use the configuration conventions 216 to generate the possible configuration parameters 234 "jdoe" for the login name, and "mail.foo.com" for the server name.

Email providers use many conventions when determining configuration parameters, and as a result, the module 232 generates many sets of possible configuration parameters 234. To reduce the number of sets generated, the module 232 may only generate a subset of the sets of possible configuration parameters 234 based on additional user information, or based on heuristics of likelihood 233 that a given set of configuration parameters 234 may be successful under a given scenario. In an example embodiment, the user may indicate that only configuration conventions 216 with a protocol expression 239 of "IMAP" should be considered. In the example, the heuristics 233 could include tracking statistics about the number of attempts and percentage of successes using a given configuration convention 216, and thereby only generate possible configuration parameters 234 based on this configuration convention 216 if certain conditions are met.

Although many email providers adhere to fairly standard conventions for configuration parameters, such as naming the mail host "mail.<MailDomain>" and matching the login name to the email address, there are many other email providers that employ less obvious conventions, such as setting the login name to be <FirstName(1)><LastName(3)>, which in the case of the user with e-mail address of "john.smith@foo.com" would translate to the login name of "jsmi". In the case of protocols that use uniform resource locators (URL) to indicate the location of the mailbox, the conventions are even less standard, since the login names are often embedded in the middle of the URL.

By capturing these conventions in the data store, it is possible for the service that requires access to the user's mailbox to use the conventions to generate potentially valid sets of configuration parameters, and then attempt to determine a valid set of configuration parameters that can be used to access the user's mailbox. Therefore, it is possible to determine the set of configuration parameters for the user's mailbox even if the user is unable to provide all of the necessary configuration information. All that may be required from the user is an email address and password, from which the system may be able to successfully determine the configuration parameters in most cases. As new conventions are introduced or are discovered, they may be easily added to the data store.

The configuration parameters could be represented using symbolic expressions, which may then be retained in the configuration conventions data store 218 for use by the service. This allows the service to draw configuration conventions from the data store, and using context data, to construct a valid set of configuration parameters that can be used to access mailboxes.

Figure 12:
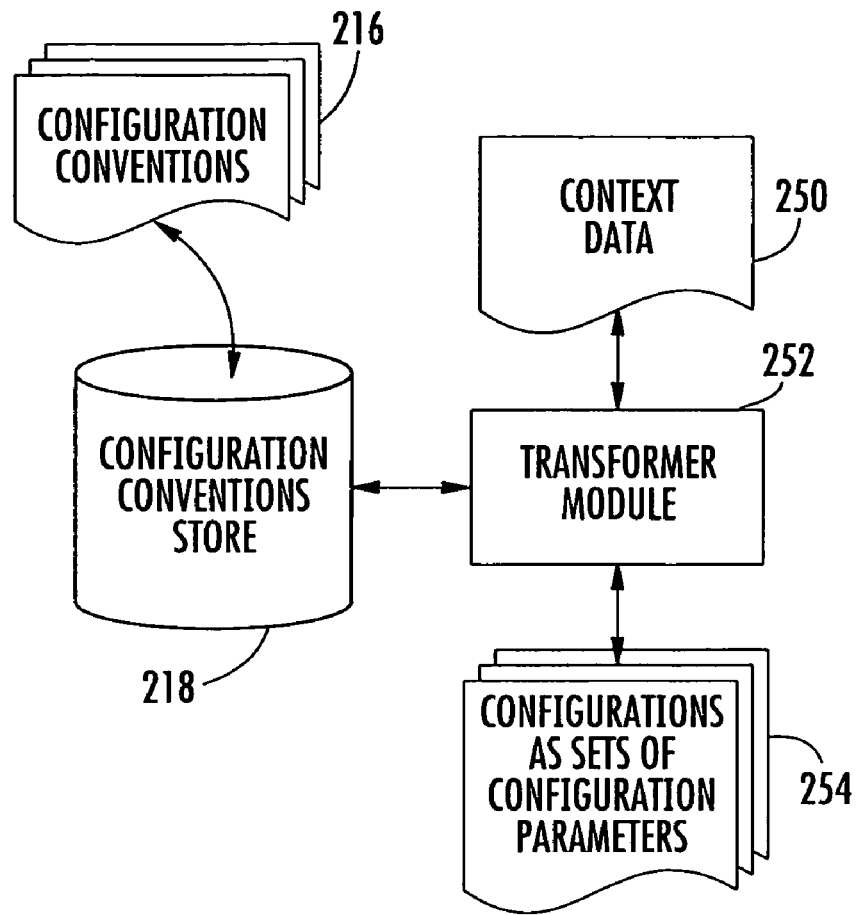
FIG. 12 is a block diagram illustrating a system for using symbolic expressions to represent conventions used for mailbox configuration parameters.

FIG. 12 illustrates an example of a system for generating configurations that comprise sets of configuration parameters 254. A transformer module 252 as part of server 211 takes configuration conventions 216 stored in a configuration conventions data store 218 and expands them to generate configuration parameters 254 based on user supplied context data 250.

Figure 13:
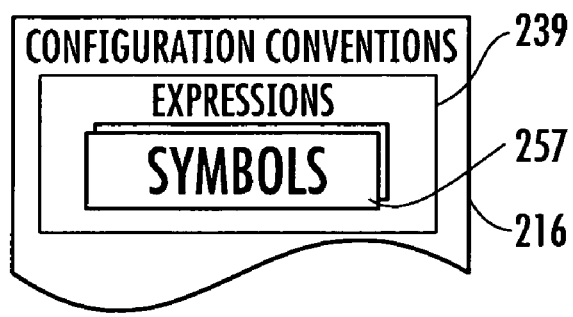
FIG. 13 is a block diagram showing an example of a representation for configuration conventions that are sets of email expressions formed by symbols.

FIG. 13 shows further details of the symbolic representation of configuration conventions 216. The configuration conventions 216 symbolically represent the conventions used by email providers for a set of configuration parameters. The configuration conventions 216 comprise expressions 239 that represent individual configuration parameters using symbols 257. In an example embodiment, the configuration convention 216 may be formed as an expression for the server name parameter, an expression for the login name parameter, and an expression for the mail protocol. If, in the example embodiment, the email provider uses the login name "jsmi" and the mail domain "mail.foo.com" given an email address "john.smith@foo.com", the login name expression in the configuration convention 216 may be "<FirstName(1)><LastName(3)>", while the server name expression may be "mail.<MailDomain>". In this example, the number in brackets within the symbol 257 "<FirstName(1)>", represents the number of characters to be used from the users first name parameter, i.e., "j". Similarly, the number in brackets in a symbol 257 "<LastName(3)>" represents the number of characters to be used from the users last name, ie. "smi". As is obvious to one skilled in the art, a variety of different symbolic representations may be used to represent the conventions for configuration parameters. The choice of expressions 239 can be quite arbitrary, and are only limited by the requirement that the expression 239 can be expanded into a configuration parameter based on the context data 250 supplied to the transformer module 252.

The configuration conventions data store 218 stores the configuration conventions 216. As new conventions are introduced or discovered, they may be easily added to the configuration conventions data store 218.

The transformer module 252 expands the individual expressions 239 into configuration parameters by expanding each symbol 257 into its corresponding value using context data 250. In an example embodiment, a configuration convention 216 may comprise the mail protocol expression 239a, "POP", the server name expression 239b "mail.<MailDomain>" and the login name expression 239c "<FirstName(1)><LastName(3)>", for example, as shown in FIG. 11 for a plurality of expressions. If the transformer module 252 were provided with the context data 250 comprising the email address "john.smith@foo.com", the transformer module 252 would infer the mail domain as "foo.com" from the email address. It would then generate the configuration parameters 234 of "POP" for the mail protocol, "mail.foo.com" for the server name, and "jsmi" for the login name.

An example of a handheld mobile wireless communications device 1000 that may be used is further described in the example below with reference to FIG. 14. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 14:
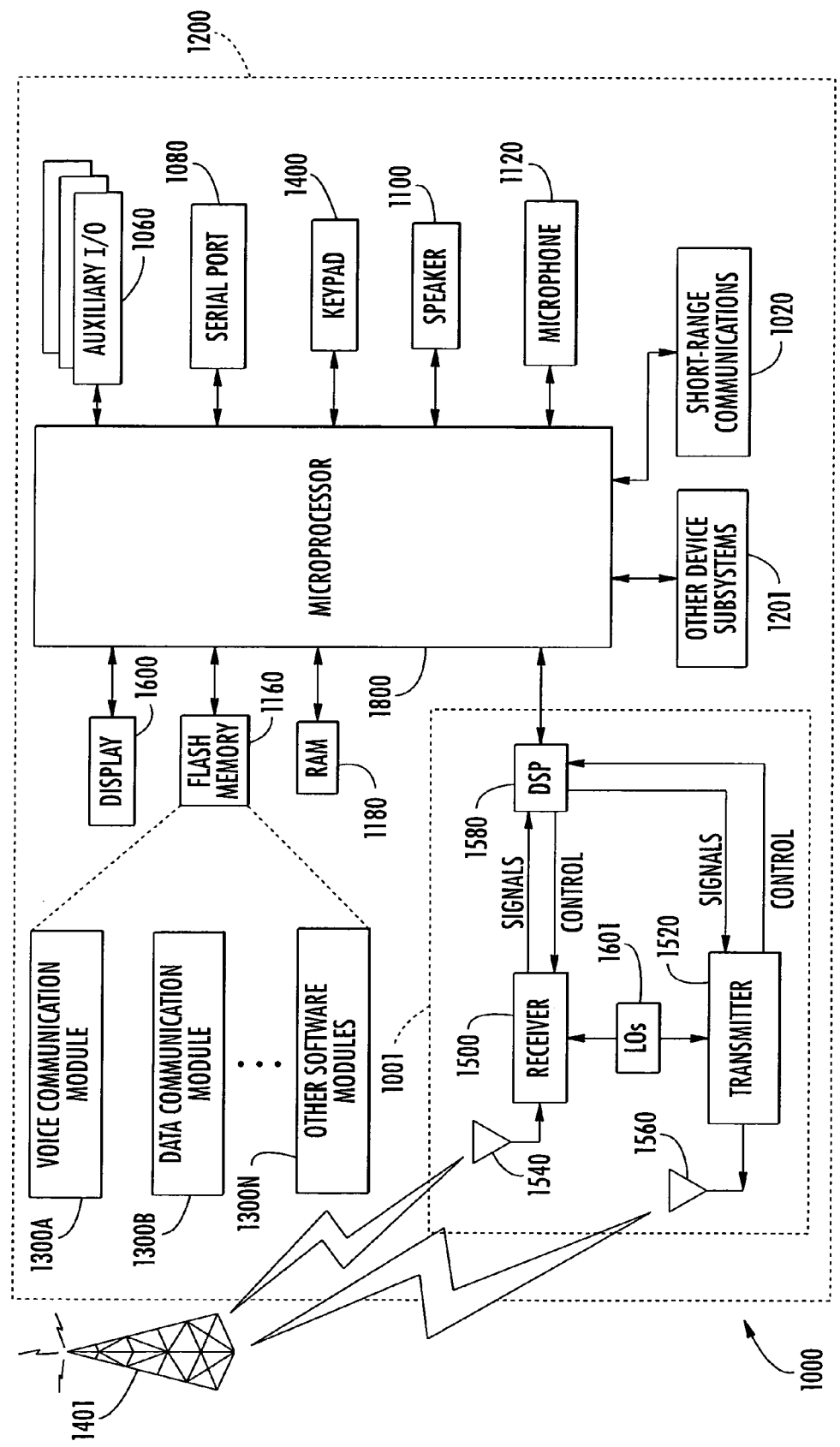
FIG. 14 is a schematic block diagram illustrating an exemplary mobile wireless communications device that can be used with the Direct Access system shown in FIG. 1.

In addition to the processing device 1800, other parts of the mobile device 1000 are shown schematically in FIG. 14. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

This application is related to copending patent applications entitled, "SYSTEM AND METHOD FOR PROVISIONING AN EMAIL ACCOUNT USING MAIL EXCHANGE RECORDS" which is filed on the same date and by the same assignee and inventors.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for provisioning a new electronic mail (email) account for allowing access to an electronic mailbox from a remote device to retrieve email, the system comprising:
    a processor and a memory coupled thereto defining a communications module and a configuration module; and
    a database containing relevant configuration conventions comprising sets of email expressions formed by symbols symbolically representing the conventions used by email service providers for a set of configuration parameters;
    said communications module configured to
        receive email address parameters comprising at least an email address;
        transmit a domain name system (DNS) query to the Internet for returning, at a same time, mail exchange (MX) and address (A) records, the query including a user domain based on the email address;
    said configuration module further configured to
        determine whether any MX or A records exist based on the user domain,
        determine a mail server for an email domain of the new email account based on at least one of the MX and A records returned in the query, the mail server determined without attempting to validate all possible email domains,
        generate sets of possible configuration parameters for attempting access to an electronic mailbox by using heuristics of likelihood of whether a set of configuration parameters would be valid for accessing the electronic mailbox
        determine when no MX and A records exist based upon the query, email cannot be delivered to or retrieved from the new email account based on the entered email address parameters, and
        indicate that incorrect email address parameters have been entered and provisioning of the new email account cannot begin until correct email address parameters are entered.

2. A system according to claim 1, wherein said communications module receives a password, and said configuration module is operative for determining the configuration parameters for accessing the email account and attempting access to the new email account based on the returned MX and A records and the received password.

3. A system according to claim 1, wherein said configuration module is operative for obtaining from the MX records a prioritized list of possible mail servers to which the new email account is to be accessed and determining the mail server for the corresponding email domain of the new email account based on priority.

4. A system according to claim 1, wherein the configuration parameters further comprise at least one of a mail host, port, and password.

5. A system according to claim 1, and further comprising mobile a office platform on which said communications module and configuration module are operative, and having a direct access proxy used for accessing an electronic mailbox.

6. A method of provisioning a new electronic mail (email) account for allowing access to an electronic mailbox from a remote device to retrieve email, which comprises:
- receiving email address parameters comprising at least an email address;
- transmitting a domain name system (DNS) query to the Internet and returning, at a same time, mail exchange (MX) and address (A) records, the query including a user domain based on the email address;
- retrieving from a database relevant configuration conventions comprising sets of email expressions formed by symbols symbolically representing the conventions used by email providers for a set of configuration parameters;
- determining whether any MX or A records exist based on the user domain;
- determining a mail server for an email domain of the new email account based on at least one of the MX and A records returned in the query, the mail server determined without attempting to validate all possible email domains;
- generate sets of possible configuration parameters for attempting access to an electronic mailbox by using heuristics of likelihood of whether a set of configuration parameters would be valid for accessing the electronic mailbox;
- determining when no MX and A records exist based upon the query, email cannot be delivered to or retrieved from the new email account based on the entered email address parameters; and
- indicating that incorrect email address parameters have been entered and provisioning of the new email account cannot begin until correct email address parameters are entered.

7. A method according to claim 6, which further comprises receiving a password, determining the configuration parameters for accessing the new email account from any returned MX and A records, and attempting access to the new email account based upon the configuration parameters and the received password.

8. A method according to claim 6, which further comprises obtaining from the MX records a prioritized list of possible mail servers to which the new email account is to be accessed, and determining the mail server for the corresponding email domain of the new email account based on priority.

9. A method according to claim 6, the configuration parameters comprise at least one of a mail host, port, and password.

10. A method according to claim 6, which further comprises determining the configuration parameters within a mobile office platform having a direct access proxy for accessing an electronic mailbox.

11. A non-transitory computer-readable medium having computer-executable instructions for executing instructions for provisioning a new electronic mail (email) account, which comprise:
- receiving email address parameters comprising at least an email address;
- transmitting a domain name system (DNS) query to the Internet and returning, at a same time, MX and address (A) records corresponding to the email address parameters;
- retrieving from a database relevant configuration conventions comprising sets of email expressions formed by symbols symbolically representing the conventions used by email providers for a set of configuration parameters;
- determining whether any MX or A records exist based on the user domain;
- determining a mail server for an email domain of the new email account based on at least one of the MX and A records returned in the query, the mail server determined without attempting to validate all possible email domains;
- generate sets of possible configuration parameters for attempting access to an electronic mailbox by using heuristics of likelihood of whether a set of configuration parameters would be valid for accessing the electronic mailbox;
- determining when no MX and A records exist based upon the query, email cannot be delivered to or retrieved from the new email account based on the entered email address parameters; and
- indicating that incorrect email address parameters have been entered and provisioning of the new email account cannot begin until correct email address parameters are entered.

* * * * *